(12) United States Patent
Fu et al.

(10) Patent No.: US 11,604,736 B2
(45) Date of Patent: Mar. 14, 2023

(54) MEMORY CLEANING METHOD, INTELLIGENT TERMINAL AND READABLE STORAGE MEDIUM

(71) Applicant: SHENZHEN CHUANGWEI-RGB ELECTRONICS CO., LTD., Shenzhen (CN)

(72) Inventors: Jiayin Fu, Shenzhen (CN); Shanhui Tian, Shenzhen (CN)

(73) Assignee: SHENZHEN CHUANGWEI-RGB ELECTRONICS CO., LTD., Shenzhen (CN)

( * ) Notice: Subject to any disclaimer, the term of this patent is extended or adjusted under 35 U.S.C. 154(b) by 21 days.

(21) Appl. No.: 17/253,981

(22) PCT Filed: Oct. 30, 2020

(86) PCT No.: PCT/CN2020/125545
§ 371 (c)(1),
(2) Date: Mar. 10, 2021

(87) PCT Pub. No.: WO2021/248785
PCT Pub. Date: Dec. 16, 2021

(65) Prior Publication Data
US 2022/0188239 A1    Jun. 16, 2022

(30) Foreign Application Priority Data
Jun. 11, 2020   (CN) .......................... 202010531768.7

(51) Int. Cl.
*G06F 12/0891*   (2016.01)
*G06F 12/02*     (2006.01)
*G06F 12/0804*   (2016.01)

(52) U.S. Cl.
CPC ...... *G06F 12/0891* (2013.01); *G06F 12/0253* (2013.01); *G06F 12/0804* (2013.01)

(58) Field of Classification Search
CPC ............. G06F 12/0891; G06F 12/0253; G06F 12/0804; G06F 9/5016; G06F 9/5022; G06F 16/162; Y02D 10/00
See application file for complete search history.

(56) References Cited

U.S. PATENT DOCUMENTS 6,446,091 B1 *  9/2002  Noren ................. G06F 11/1435
8,089,423 B1 *  1/2012  Harris ..................... G09G 5/005
                                                              715/752

(Continued)

*Primary Examiner* — Sean D Rossiter
(74) *Attorney, Agent, or Firm* — Platinum Intellectual Property PC

(57) ABSTRACT

The present disclosure provides a memory cleaning method, a smart terminal, and a readable storage medium. When the smart terminal is switched from a first display state to a second display state, an application to be cleaned is determined. A space to be cleaned is determined from a running memory and cache space occupied during running of the application to be cleaned. Files are removed from each of the determined spaces to be cleaned. In this way, an application to be cleaned is determined when the smart terminal is switched from a first display state to a second display state, so that an application to be cleaned can be directly cleaned in the background, and applications can be cleaned in real time without affecting the user's normal operation, which contributes to more timely cleaning of applications and an improved user experience.

18 Claims, 4 Drawing Sheets

(56) References Cited

U.S. PATENT DOCUMENTS

| | | | |
|---|---|---|---|
| 9,681,165 B1* | 6/2017 | Gupta | H04N 21/44008 |
| 11,194,885 B1* | 12/2021 | Parhami | G06F 16/9577 |
| 2017/0262224 A1* | 9/2017 | Gu | G06F 3/0608 |
| 2019/0220216 A1* | 7/2019 | Chen | G06F 9/44594 |
| 2019/0347050 A1* | 11/2019 | Sung | G06F 9/44505 |
| 2020/0133562 A1* | 4/2020 | Morishige | G06F 9/4403 |
| 2022/0012085 A1* | 1/2022 | Shi | G06F 12/0253 |

* cited by examiner

MEMORY CLEANING METHOD, INTELLIGENT TERMINAL AND READABLE STORAGE MEDIUM

CROSS-REFERENCE TO RELATED APPLICATIONS

The present disclosure is a United States National Stage Application filed under 35 U.S.C. 371 of PCT Patent Application Serial No. PCT/CN2020/125545, filed Oct. 30, 2020, which claims priority to Chinese Patent Application No. 2020105317687, filed with the Chinese Patent Office on Jun. 11, 2020, entitled "Memory Cleaning Method, Intelligent Terminal and Readable Storage Medium", which is incorporated herein by reference in its entirety.

TECHNICAL FIELD

The present disclosure relates to the technical field of memory management, and in particular to a memory cleaning method, a smart terminal (an intelligent terminal), and a readable storage medium.

BACKGROUND ART

With the rapid development of computer technologies, smart terminals are gradually used in daily life and bring convenience to people's lives. However, during use of a smart terminal, the response speed of the entire system is often slowed down due to too many applications in the background and a lot of garbage unreleased. As a result, the smart terminal provides a worse overall experience to the user.

At this stage, a memory occupied by applications running on a smart terminal and the generated garbage (or useless) files are usually released by manually cleaning the applications in the background of the smart terminal and garbage generated during its running by a user. The normal operation of the smart terminal by the user will be interrupted in the cleaning process. Moreover, in general, the user will be reminded or promoted to clean the memory only when the background occupancy rate is too high. As a result, too much garbage is stored in the background, the smart terminal may become delayed, and consequently, the user may have a poor experience of using the smart terminal.

SUMMARY

In view of the above, one of the objects of the present disclosure is to provide a memory cleaning method, a smart terminal, and a readable storage medium. When the smart terminal is switched from a first display state to a second display state, an application to be cleaned is determined, and the application to be cleaned is directly cleaned in the background. In this way, applications can be cleaned in real time without affecting the user's normal operation, which contributes to timelier cleaning of applications and an improved user experience.

An embodiment of the present disclosure provides a memory cleaning method. The cleaning method includes:

determining an application to be cleaned when the smart terminal is switched from a first display state to a second display state;

determining a space to be cleaned from a running memory and cache space occupied during running of the application to be cleaned; and removing files from each of the determined spaces to be cleaned.

In a possible implementation, the step of determining an application to be cleaned when the smart terminal is switched from a first display state to a second display state includes:

determining at least one target application running on the smart terminal in the first display state; and determining a target application that can run only in the first display state from the at least one target application as an application to be cleaned.

In a possible implementation, the step of determining a space to be cleaned from a running memory and cache space occupied during running of the application to be cleaned includes:

determining, from the running memory and the cache space, at least one file to be processed generated while running the application to be cleaned;

detecting whether each file to be processed is a running file generated while running the application to be cleaned; and determining a memory space corresponding to each non-running file as the space to be cleaned.

In a possible implementation, the step of removing files from each of the determined spaces to be cleaned includes:

acquiring a unique identifier corresponding to each space to be cleaned, wherein the unique identifier corresponds to a space position in a storage space that is occupied by the space to be cleaned; and cleaning the space position according to the unique identifier.

In a possible implementation, before the step of determining an application to be cleaned when the smart terminal is switched from a first display state to a second display state, the cleaning method further includes:

controlling the smart terminal to rotate in a plane where the smart terminal is located, when a rotation command output from a user terminal is received, or it is detected that a terminal application that can run only in the second display state is started; and controlling the smart terminal to be switched from the first display state to the second display state based on an angle of rotation of the smart terminal.

In a possible implementation, the rotation angle is 90°.

In a possible implementation, after the step of removing files from each of the determined spaces to be cleaned, the cleaning method further includes:

detecting whether files have been cleaned from each space to be cleaned;

updating a usage state corresponding to the space to be cleaned from which the files have been cleaned from an occupied state to an idle state.

In a possible implementation, when it is detected that files are not completely cleaned from a space to be cleaned, the cleaning method further includes:

detecting a status of cleaning of files from the space to be cleaned at preset time intervals until all the files have been cleaned from the space to be cleaned.

In a possible implementation, the first display state and the second display state include a horizontal screen orientation or a vertical screen orientation.

An embodiment of the present disclosure further provides a smart terminal. The smart terminal includes:

an application determining module, configured to determine an application to be cleaned when the smart terminal is switched from a first display state to a second display state;

a space determining module, configured to determine a space to be cleaned from a running memory and cache space occupied during running of the application to be cleaned; and a space cleaning module, configured to remove files from each of the determined spaces to be cleaned.

In a possible implementation, the application determining module is specifically configured to:

determine at least one target application running on the smart terminal in the first display state; and determine a target application that can run only in the first display state from the at least one target application as an application to be cleaned.

In a possible implementation, the space determining module is specifically configured to:

determine, from the running memory and the cache space, at least one file to be processed generated while running the application to be cleaned;

detect whether each file to be processed is a running file generated while running the application to be cleaned; and determine a memory space corresponding to each non-running file as the space to be cleaned.

In a possible implementation, the space cleaning module is specifically configured to:

acquire a unique identifier corresponding to each space to be cleaned, wherein the unique identifier corresponds to a space position in a storage space that is occupied by the space to be cleaned; and clean the space position according to the unique identifier.

In a possible implementation, the smart terminal further includes a rotation controlling module, configured to:

control the smart terminal to rotate in a plane where the smart terminal is located, when a rotation command output from a user terminal is received, or it is detected that a terminal application that can run only in the second display state is started; and control the smart terminal to be switched from the first display state to the second display state based on an angle of rotation of the smart terminal.

In a possible implementation, when the application determining module is configured to determine an application to be cleaned when the smart terminal is switched from a first display state to a second display state, the application determining module is configured to:

determine at least one target application running on the smart terminal in the first display state; and determine a target application that can run only in the first display state from the at least one target application as an application to be cleaned.

In a possible implementation, the space determining module is configured to determine the space to be cleaned by the steps of:

determining, from the running memory and the cache space, at least one file to be processed generated while running the application to be cleaned;

detecting whether each file to be processed is a running file generated while running the application to be cleaned; and determining a memory space corresponding to each non-running file as the space to be cleaned.

In a possible implementation, the smart terminal further includes a state change module, configured to:

detect whether files have been cleaned from each space to be cleaned; and update a usage state corresponding to the space to be cleaned from which the files have been cleaned from an occupied state to an idle state.

An embodiment of the present disclosure further provides an electronic device, comprising: a processor, a memory, and a bus. The memory stores machine-readable instructions executable by the processor. When the electronic device is operating, the processor communicates with the memory via the bus, and the machine-readable instructions are executed by the processor to execute the steps of the memory cleaning method as described above.

An embodiment of the present disclosure further provides a computer-readable storage medium. The computer-readable storage medium stores a computer program that, when run by a processor, executes the steps of the memory cleaning method as described above.

The embodiments of the present disclosure provide a memory cleaning method, a smart terminal, and a readable storage medium. When the smart terminal is switched from a first display state to a second display state, an application to be cleaned is determined. A space to be cleaned is determined from a running memory and cache space occupied by the application to be cleaned. Files are removed from each space to be cleaned. In this way, an application to be cleaned can be directly cleaned in the background, and applications can be cleaned in real time without affecting the user's normal operation, which contributes to timelier cleaning of applications and an improved user experience.

In order to enable clearer and easier understanding of the above objects, features, and advantages of the present disclosure, preferred embodiments will be described in detail below by way of example with reference to the accompanying drawings.

BRIEF DESCRIPTION OF THE DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

DETAILED DESCRIPTION OF THE EMBODIMENTS

Figure 1:
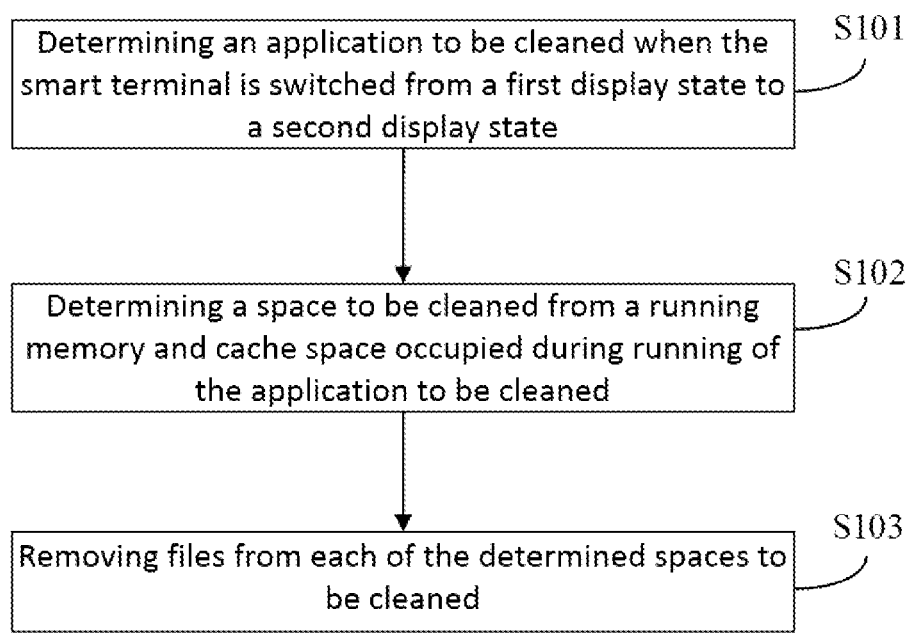
FIG. 1 is a flowchart of a memory cleaning method according to an embodiment of the present disclosure.

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations. Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

Application scenarios to which the present disclosure is applicable will be described first. The embodiments of the present disclosure are applicable to the technical field of memory management. With the development of smart terminal technologies, more and more terminal applications of games, videos, and programs are installed on a smart terminal. Each terminal application will occupy a running memory in the background of the system of the smart terminal during its running, and the cache space in the background of the system will also be occupied by storing data in the terminal applications (e.g., operations such as caching of videos in video applications). The operating speed of the system will be slowed down due to occupation of these spaces. If the memory space is not cleaned for a long time, the system of the smart terminal will become delayed, and the use of the smart terminal will be affected.

It has been found in research that, at this stage, a memory occupied by applications running on a smart terminal and the generated garbage files are usually released by manually cleaning the applications in the background of the smart terminal and garbage generated during its running by a user. The normal operation of the smart mobile by the user will be interrupted in the cleaning process. Moreover, in general, the user will be reminded or promoted to clean the memory only when the background occupancy rate is too high. As a result, too much garbage is stored in the background, the smart terminal may become delayed, and consequently, the user may have a poor experience of using the smart terminal.

On this basis, an embodiment of the present disclosure provides a memory cleaning method. When a smart terminal is switched from a first display state to a second display state, an application to be cleaned is determined, and the application to be cleaned is directly cleaned in the background. In this way, applications can be cleaned in real time without affecting the user's normal operation, which contributes to timelier cleaning of applications and an improved user experience.

Referring to FIG. 1, FIG. 1 is a flowchart of a memory cleaning method according to an embodiment of the present disclosure. As shown in FIG. 1, the memory cleaning method according to the embodiment of the present disclosure may include following steps.

In S101, when the smart terminal is switched from a first display state to a second display state, an application to be cleaned is determined.

In this step, when it is detected that the display state of the smart terminal is switched from the first display state to the second display state, an application to be cleaned that needs to be cleaned is determined.

Optionally, the smart terminal may be switched in an unrestricted manner, which may be set according to actual application requirements. For example, in some possible embodiments, the smart terminal is a rotatable terminal, and the smart terminal itself switches the display state. For another example, in other possible embodiments, a rotating bracket may be mounted to the smart terminal, and the smart terminal (e.g., a terminal device such as a television) may be rotated by means of controlling the rotation of the rotating bracket. For another example, in other possible embodiments, the smart terminal may be switched by directly rotating the smart terminal which is a rotatable terminal (e.g., a terminal device such as a smart phone).

In some possible embodiments, the display state of the smart terminal may include a horizontal screen orientation and a vertical screen orientation. The first display state may refer to the screen orientation of the smart terminal before being rotated. The second display state may refer to the screen orientation of the rotated smart terminal. For example, when it is detected that the smart terminal is switched from the horizontal screen orientation to the vertical screen orientation, it can be considered that the smart terminal is switched from the first display state to the second display state.

Figure 2:
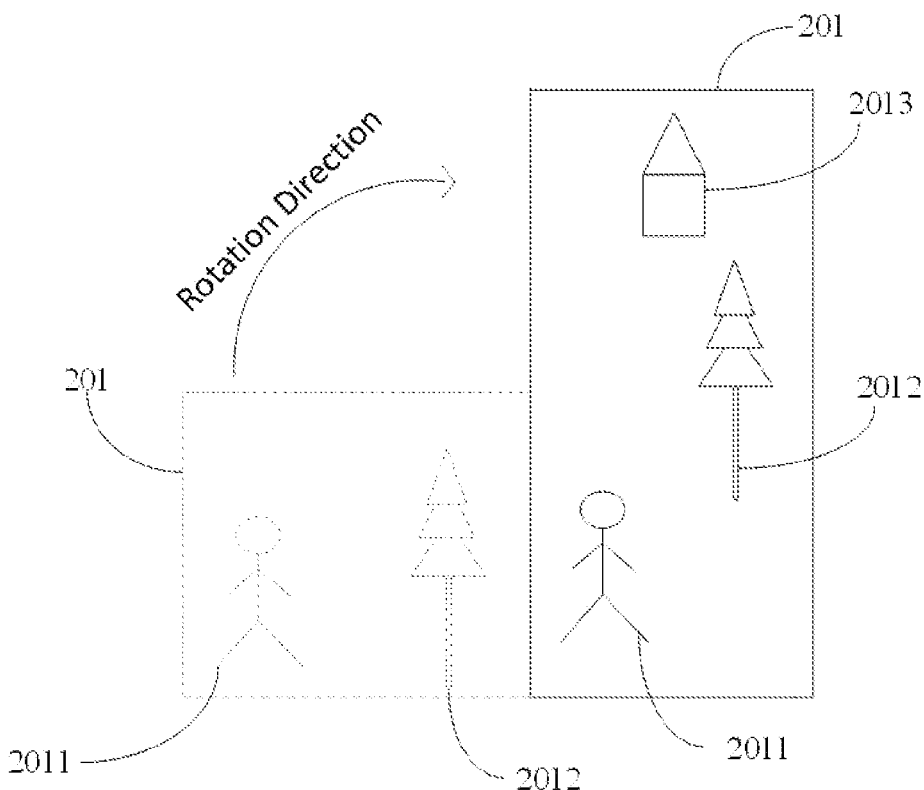
FIG. 2 is a schematic diagram showing a rotation of a smart terminal according to an embodiment of the present disclosure when switching from a first display state to a second display state.

Referring to FIG. 2, FIG. 2 is a schematic diagram showing a rotation of a smart terminal when switching from the first display state to the second display state. As shown in FIG. 2, a television 201 is taken as an example of the smart terminal. The first display state of the television 201 may be a horizontal screen display state, in which a character 2011 and a tree 2012 may be displayed on the screen of the television 201. When a rotation command is received, the television 201 is rotated clockwise by 90° and switched to a vertical screen display state. In the vertical screen display state, the scene is changed. The character 2011 and the tree 2012 displayed on the screen of the television 201 are displayed in unchanged orientations, the distance between the character and the tree is decreased depending on the change of the screen, and a house 2013 may be displayed in the new scene in the vertical screen display state.

In S102, a space to be cleaned is determined from a running memory and cache space occupied during running of the application to be cleaned.

In this step, after the applications to be cleaned are determined in step S101, a space to be cleaned is determined for the running memory and the cache space occupied by each application to be cleaned during its running.

In some possible embodiments, while an application is running, the running memory in the background of the system will be occupied by the running application. At the same time, certain data will be generated while running the application, and all the data will be stored in the cache space in the background of the system in the form of files. Both the files in the running memory and the files in the cache space may occupy the space when the application is running, and they should be deleted in a targeted manner so as to clear the running memory for the application.

In S103, files are removed from each of the determined spaces to be cleaned.

In this step, after a plurality of spaces to be cleaned are determined in step S102, files corresponding to the application to be cleaned are deleted from each space to be cleaned, thereby completing the cleaning of the space to be cleaned.

In some possible embodiments, each space to be cleaned occupies a unique space position in the background storage space, and each space position has a corresponding unique identifier. The space position corresponding to the space to be cleaned can be accurately determined according to the corresponding unique identifier, thereby cleaning the files from the space position.

In the memory cleaning method according to the embodiment of the present disclosure, when the smart terminal is switched from a first display state to a second display state, an application to be cleaned is determined. A space to be cleaned is determined from a running memory and cache space occupied by the application to be cleaned. Files are removed from each of the determined spaces to be cleaned. In this way, an application to be cleaned can be directly cleaned in the background, without interrupting an operation being performed and manually cleaning the application by the user. This reduces the time for cleaning an application and contributes to an improved application cleaning efficiency and improved user experience.

Figure 3:
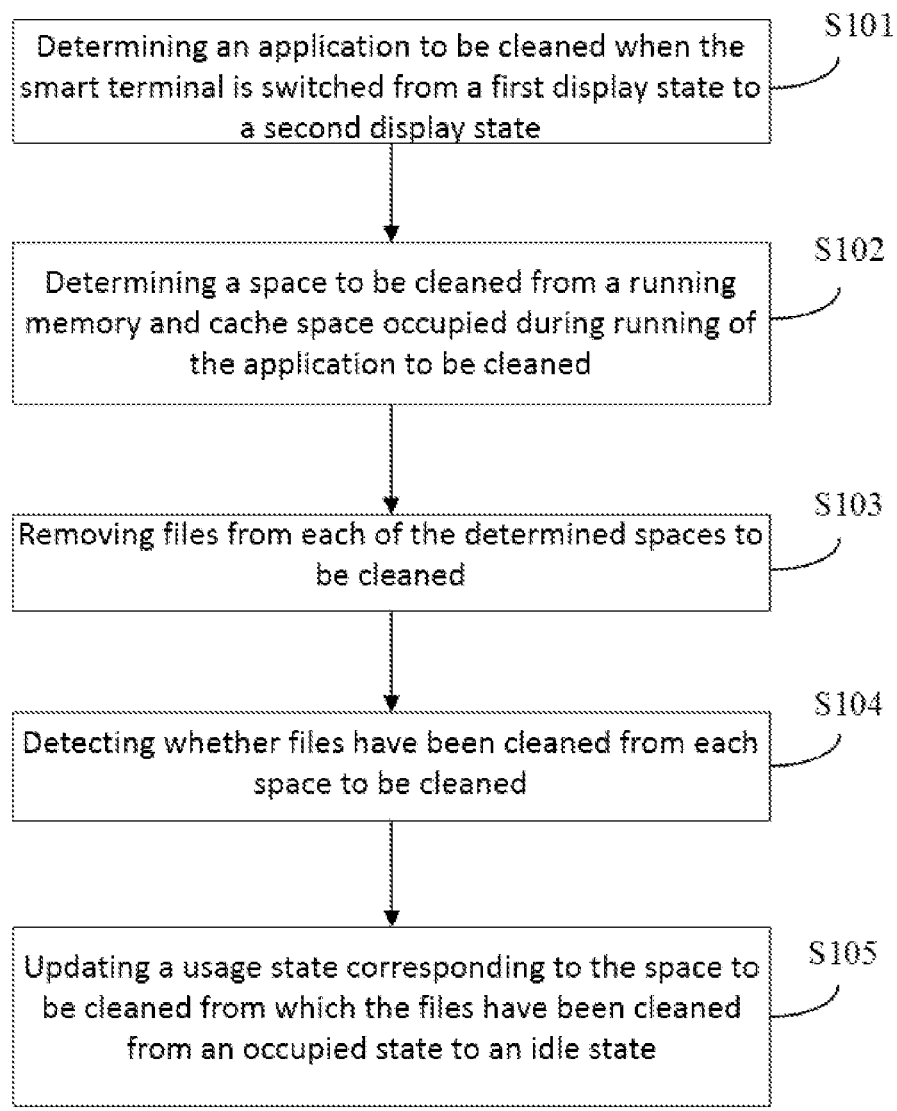
FIG. 3 is a flowchart of another memory cleaning method according to an embodiment of the present disclosure.

Referring to FIG. 3, FIG. 3 is a flowchart of another memory cleaning method according to an embodiment of the present disclosure. As shown in FIG. 3, after step S103, the memory cleaning method according to the embodiment of the present disclosure may include:

S104 of detecting whether files have been cleaned from each space to be cleaned.

In this step, it is detected whether the files have been cleaned from each space to be cleaned.

In some possible embodiments, when it is detected that files are not completely cleaned from a space to be cleaned, a status of cleaning of files from the space to be cleaned is detected at preset time intervals until all the files have been cleaned from the space to be cleaned. When it is detected that the files have been cleaned from the space to be cleaned, step S105 is executed.

In S105, a usage state corresponding to the space to be cleaned from which files have been cleaned is updated from an occupied state to an idle state.

In this step, if a space to be cleaned from which files have been cleaned is detected in step S104, the state of the space to be cleaned is changed from the occupied state to the idle state.

In some possible embodiments, for a space changed to the idle state, if the space is a running space, the space may be kept in the idle state until an application by which the running space is originally occupied runs again and the space is occupied again. In other possible embodiments, if the space is a cache space, files generated while any terminal application is running may be stored in the space after the state of the space is changed to the idle state.

In some possible embodiments, before step S101, the cleaning method may further include: controlling the smart terminal to rotate in a plane where the smart terminal is located, when a rotation command output from a user terminal is received, or it is detected that a terminal application that can run only in the second display state is started; controlling the smart terminal to be switched from the first display state to the second display state based on an angle of rotation of the smart terminal.

In this step, when a rotation command output from a user terminal is received, or it is detected that a terminal application that can run only in the second display state is started, the smart terminal is controlled to rotate in a plane where the smart terminal is located, and the smart terminal is controlled to be switched from the first display state to the second display state based on an angle of rotation of the smart terminal.

In some possible embodiments, in general, the smart terminal is caused to be switched from the first display state to the second display state because the smart terminal is rotated. For example, when the smart terminal is a mobile phone in which a horizontal (vertical) screen locking mode is not enabled, the display state of the mobile phone will be switched from the vertical screen state to the horizontal screen state if the user rotates the mobile phone from the vertical state to the horizontal state.

Optionally, the smart terminal may be rotated in an unrestricted manner, which may be set according to actual application requirements. For example, in some possible embodiments, a rotation command may be received from the user terminal, and the smart terminal may be rotated according to the rotation direction indicated by the command. For another example, in other possible embodiments, when a terminal application to be run cannot be displayed in the current screen display state, the smart terminal may actively rotate to a display state corresponding to the terminal application to be run, so that an interface of the terminal application to be run is displayed.

Optionally, the specific value of the rotation angle of the smart terminal is not limited and may be set according to actual application requirements. For example, in some possible embodiments, the rotation angle may be set to 90°. In other words, there is an angle of 90° between the smart terminal in the first display state and the smart terminal in the second display state. The smart terminal is controlled to be switched from the first display state to the second display state only when the smart terminal is rotated by 90°.

In the case where there is no need to switch from the first display state to the second display state, the above-mentioned method can effectively prevent a misoperation of switching from the first display state to the second display state that is caused by, for example, shaking of the smart terminal or rotation of the smart terminal for adjusting the viewing angle.

In some possible embodiments, step S101 may include: determining at least one target application running on the smart terminal in the first display state; determining a target application that can run only in the first display state from the at least one target application as an application to be cleaned.

In this step, at least one target application running in the first display state on the smart terminal which has not been switched from the first display state to the second display state is determined. A target application that can run only in the first display state is determined from the at least one target application. The target application that can run only in the first display state is determined as an application to be cleaned.

Optionally, each terminal application may be presented in a different display state. For example, in some possible embodiments, a terminal application should be displayed in the horizontal screen mode of the smart terminal. For another example, in other possible embodiments, a terminal application should be displayed in the vertical screen mode of the smart terminal. For another example, in other possible embodiments, a smart application can be displayed both in the horizontal screen mode of the smart terminal and in the vertical screen mode of the smart terminal. During cleaning, it is necessary to clean a target application that runs only in the display state of the smart terminal before being rotated.

In some possible embodiments, the space to be cleaned may be determined in step S102 by the steps of: determining, from the running memory and the cache space, at least one file to be processed generated while running the application to be cleaned; detecting whether each file to be processed is a running file generated while running the application to be cleaned; determining a memory space corresponding to each non-running file as the space to be cleaned.

In this step, a plurality of files to be processed in each space are determined from the running memory and the cache space corresponding to the application to be cleaned. All these files to be processed are files generated when running the application to be cleaned. It is detected whether each file to be processed is a running file generated while running the application to be cleaned. A memory space corresponding to a file that is not a running file generated while running the application to be cleaned is determined as the space to be cleaned.

Optionally, while each terminal application is running, some running files (e.g., registry files) related to the terminal application will be generated. These files store information on setting of the terminal application and will not be cleaned up during the memory cleaning process. Therefore, it should be ensured that running files will not be cleaned up during cleanup of files.

In the memory cleaning method according to the embodiment of the present disclosure, when the smart terminal is switched from a first display state to a second display state, at least one application to be cleaned is determined. A space to be cleaned is determined, for each application to be cleaned, from a running memory and cache space occupied by the application to be cleaned. Files are removed from each space to be cleaned. In this way, an application to be cleaned can be directly cleaned in the background, and the space state of the space to be cleaned from which files have been cleaned is changed from an occupied state to an idle state. Thus, applications can be cleaned in real time without affecting the user's normal operation, which contributes to timelier cleaning of applications and an improved user experience.

Figure 4:
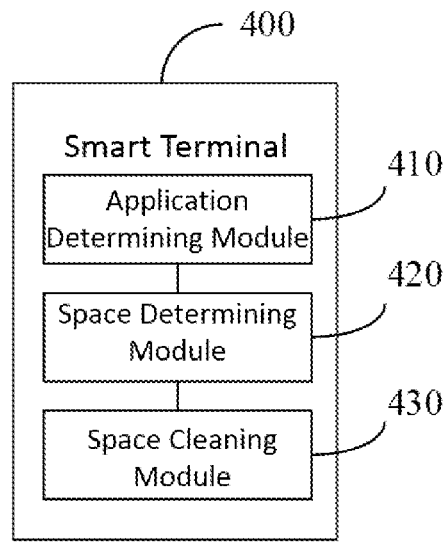
FIG. 4 is a schematic structural diagram of a smart terminal according to an embodiment of the present disclosure.
Figure 5:
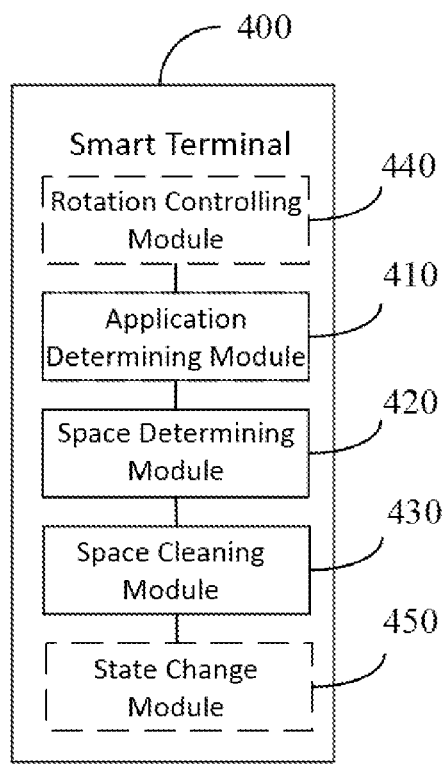
FIG. 5 is a schematic structural diagram of another smart terminal according to an embodiment of the present disclosure.

Referring to FIGS. 4 and 5, FIG. 4 is a first schematic structural diagram of a smart terminal according to an embodiment of the present disclosure, and FIG. 5 is a second schematic structural diagram of a smart terminal according to an embodiment of the present disclosure. As shown in FIG. 4, the smart terminal 400 may include following modules.

The application determining module 410 is configured to determine an application to be cleaned when the smart terminal is switched from a first display state to a second display state.

The space determining module 420 is configured to determine a space to be cleaned from a running memory and cache space occupied during running of the application to be cleaned.

The space cleaning module 430 is configured to remove files from each of the determined spaces to be cleaned.

In some possible embodiments, as shown in FIG. 5, the smart terminal 400 further includes a rotation controlling module 440. The rotation controlling module 440 is configured to:

control the smart terminal to rotate in a plane where the smart terminal is located, when a rotation command output from a user terminal is received, or it is detected that a terminal application that can run only in the second display state is started; and control the smart terminal to be switched from the first display state to the second display state based on an angle of rotation of the smart terminal.

In some possible embodiments, the smart terminal 400 further includes a state change module 450. The state change module 450 is configured to:

detect whether files have been cleaned from each space to be cleaned; and update a usage state corresponding to the space to be cleaned from which the files have been cleaned from an occupied state to an idle state.

In some possible embodiments, when the application determining module 410 is configured to determine an application to be cleaned when the smart terminal is switched from a first display state to a second display state, the application determining module 410 is specifically configured to:

determine at least one target application running on the smart terminal in the first display state; and determine a target application that can run only in the first display state from the at least one target application as an application to be cleaned.

In some possible embodiments, the space determining module 420 is specifically configured to determine the space to be cleaned by the steps of:

determining, from the running memory and the cache space, at least one file to be processed generated while running the application to be cleaned;

detecting whether each file to be processed is a running file generated while running the application to be cleaned; and determining a memory space corresponding to each non-running file as the space to be cleaned.

In some possible embodiments, the space cleaning module 430 is specifically configured to:

acquire a unique identifier corresponding to each space to be cleaned, where the unique identifier corresponds to a space position in a storage space that is occupied by the space to be cleaned; and clean the space position according to the unique identifier.

In the smart terminal according to the embodiment of the present disclosure, when the smart terminal is switched from a first display state to a second display state, an application to be cleaned is determined. A space to be cleaned is determined from a running memory and cache space occupied by the application to be cleaned. Files are removed from each of the determined spaces to be cleaned. In this way, an application to be cleaned can be directly cleaned in the background, and applications can be cleaned in real time without affecting the user's normal operation, which contributes to timelier cleaning of applications and an improved user experience.

Figure 6:
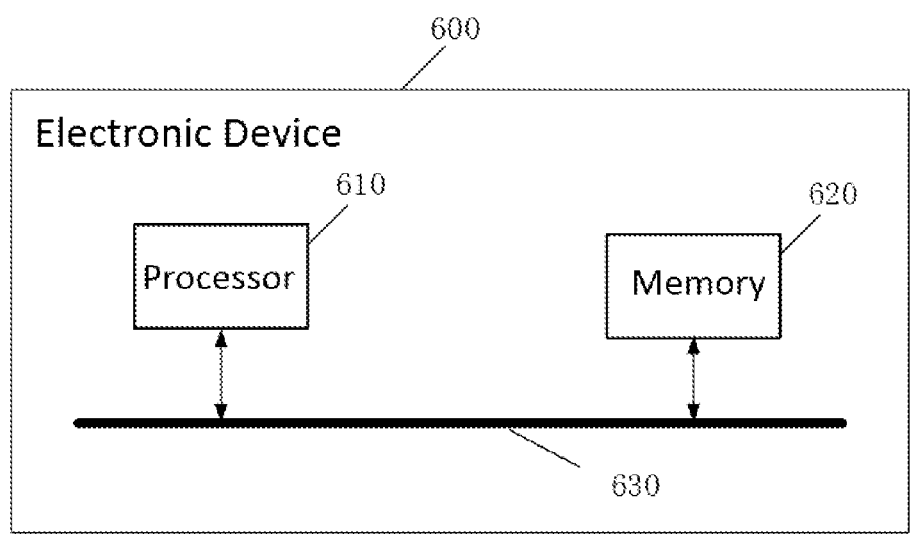
FIG. 6 is a schematic structural diagram of an electronic device according to an embodiment of the present disclosure.

Referring to FIG. 6, FIG. 6 is a schematic structural diagram of an electronic device according to an embodiment of the present disclosure. As shown in FIG. 6, the electronic device 600 includes a processor 610, a memory 620, and a bus 630.

The memory 620 stores machine-readable instructions executable by the processor 610. When the electronic device 600 is operating, the processor 610 communicates with the memory 620 via the bus 630. The machine-readable instructions may be executed by the processor 610 to execute the steps of the memory cleaning method in the method embodiment as shown in FIG. 1 or FIG. 3. The specific implementation may be understood with reference to the method embodiment and will not be described in detail herein.

An embodiment of the present disclosure further provides a computer-readable storage medium. The computer-readable storage medium stores a computer program that, when run by a processor, may execute the steps of the memory cleaning method in the method embodiment as shown in FIG. 1 or FIG. 3. The specific implementation may be understood with reference to the method embodiment and will not be described in detail herein.

It will be clearly appreciated by those skilled in the art that, for convenience and brevity of the description, specific working processes of the system, apparatus, and units described above may be performed with reference to the corresponding processes in the foregoing embodiment of the method and will not be described in detail herein.

In several embodiments according to the present disclosure, it should be understood that the disclosed system, apparatus, and method may be implemented in other ways. The embodiments of the apparatus described above are merely illustrative in nature. For example, the units are divided only by logical functions, and additional division modes may be adopted in practical implementation. For another example, multiple units or components may be combined or integrated into another system, or some features may be omitted or not executed. In addition, the mutual coupling, or direct coupling or communication connection illustrated or discussed may be implemented via indirect coupling or communication between some communication interfaces, apparatuses, or units, which may be electronic, mechanical, or in other forms.

The units described as separate components may be or not be separated physically. The components illustrated as units may be or not be physical units. In other words, they may be located at one place or they may be distributed onto multiple network units. Some or all of the units may be selected as actually required to fulfill the purposes of the solutions of the present embodiments.

Besides, the individual functional units in the embodiments of the present disclosure may be integrated into one processing unit, or each of the units may be physically stand-alone, or two or more of the units may be integrated into one unit.

When implemented in the form of a software functional module and sold or used as an independent product, the functions may be stored in a computer-readable storage medium. Based on such understanding, a technical solution of the present disclosure essentially, or the part thereof contributing to the prior art, or a part of the technical solution may be embodied in the form of a software product. The computer software product is stored in a storage medium, and includes a number of instructions for causing a computer device (which may be a personal computer, a server, a network device, or the like) to execute all or some of the steps of the methods described in the various embodiments of the present disclosure. The preceding storage medium includes any medium that ca store program codes, such as a USB flash disk, a mobile hard disk, a read-only memory (ROM), a random access memory (RAM), a magnetic disk, or an optical disk.

Finally, it should be noted that the embodiments described above are merely specific embodiments of the present disclosure, which are intended to illustrate the technical solutions of the present disclosure and not intended to limit the present disclosure, and to which the scope of protection of the present disclosure is not limited. Although the present disclosure has been illustrated in detail with reference to the foregoing embodiments, it should be understood by those skilled in the art that the technical solutions described in the foregoing embodiments can be modified, or variations thereof can be readily conceived of, or some of the technical features thereof can be equivalently replaced by those skilled in the art within the technical scope disclosed in the present disclosure. Such modifications, variations, or replacements do not cause the essence of the corresponding technical solution to depart from the spirit and scope of the technical solutions of the embodiments of the present disclosure, and are therefore intended to be encompassed within the scope of protection of the present disclosure. Therefore, the scope of protection of the present disclosure is to be defined by the scope of the appended claims.

INDUSTRIAL APPLICABILITY

The embodiments of the present disclosure provide a memory cleaning method, a smart terminal, and a readable storage medium. When the smart terminal is switched from a first display state to a second display state, an application to be cleaned is determined. A space to be cleaned is determined from a running memory and cache space occupied by the application to be cleaned. Files are removed from each space to be cleaned. In this way, an application to be cleaned can be directly cleaned in the background, and applications can be cleaned in real time without affecting the user's normal operation, which contributes to timelier cleaning of applications and an improved user experience.

What is claimed is:

1. A memory cleaning method, wherein the memory cleaning method is applicable to a smart terminal, wherein the cleaning method comprises:
   determining an application to be cleaned when the smart terminal is switched from a first display state to a second display state;
   determining a space to be cleaned from a running memory and a cache space occupied during running of the application to be cleaned; and
   removing files from each of determined spaces to be cleaned,
   wherein the determining a space to be cleaned from a running memory and a cache space occupied during running of the application to be cleaned comprises:
   determining, from the running memory and the cache space, at least one file to be processed, which is generated during running of the application to be cleaned;
   detecting whether each file to be processed is a running file generated during running of the application to be cleaned; and
   determining a memory space corresponding to each non-running file as the space to be cleaned.

2. The cleaning method according to claim 1, wherein the determining an application to be cleaned when the smart terminal is switched from a first display state to a second display state comprises:
   determining at least one target application running on the smart terminal in the first display state; and
   determining a target application only capable of running in the first display state, from the at least one target application as the application to be cleaned.

3. The cleaning method according to claim 2, wherein the determining a space to be cleaned from a running memory and a cache space occupied during running of the application to be cleaned comprises:
   determining, from the running memory and the cache space, at least one file to be processed, which is generated during running of the application to be cleaned;
   detecting whether each file to be processed is a running file generated during running of the application to be cleaned; and
   determining a memory space corresponding to each non-running file as the space to be cleaned.

4. The cleaning method according to claim 2, wherein the removing files from each of determined spaces to be cleaned comprises:
acquiring a unique identifier corresponding to each space to be cleaned, wherein the unique identifier corresponds to a space position in a storage space that is occupied by the one space to be cleaned; and
cleaning the space position according to the unique identifier.

5. The cleaning method according to claim 2, wherein before the determining an application to be cleaned when the smart terminal is switched from a first display state to a second display state, the cleaning method further comprises:
controlling the smart terminal to rotate in a plane where the smart terminal is located, when receiving a rotation command output from a user terminal or detecting that a terminal application only capable of running in the second display state is started; and
controlling, based on an angle of rotation of the smart terminal, the smart terminal to be switched from the first display state to the second display state.

6. The cleaning method according to claim 2, wherein after the removing files from each of determined spaces to be cleaned, the cleaning method further comprises:
detecting whether the files have been cleaned from each space to be cleaned; and
updating, from an occupied state to an idle state, a usage state corresponding to a space to be cleaned whose files have been cleaned.

7. The cleaning method according to claim 1, wherein the removing files from each of determined spaces to be cleaned comprises:
acquiring a unique identifier corresponding to each space to be cleaned, wherein the unique identifier corresponds to a space position in a storage space that is occupied by the one space to be cleaned; and
cleaning the space position according to the unique identifier.

8. The cleaning method according to claim 1, wherein before the determining an application to be cleaned when the smart terminal is switched from a first display state to a second display state, the cleaning method further comprises:
controlling the smart terminal to rotate in a plane where the smart terminal is located, when receiving a rotation command output from a user terminal or detecting that a terminal application only capable of running in the second display state is started; and
controlling, based on an angle of rotation of the smart terminal, the smart terminal to be switched from the first display state to the second display state.

9. The cleaning method according to claim 8, wherein the angle of rotation is 90°.

10. The cleaning method according to claim 1, wherein after the removing files from each of determined spaces to be cleaned, the cleaning method further comprises:
detecting whether the files have been cleaned from each space to be cleaned; and
updating, from an occupied state to an idle state, a usage state corresponding to a space to be cleaned whose files have been cleaned.

11. The cleaning method according to claim 10, wherein when detecting that the files are not completely cleaned from a space to be cleaned, the cleaning method further comprises:
detecting at preset time intervals a status of cleaning of the files in the space to be cleaned, until all the files have been cleaned from the space to be cleaned.

12. The cleaning method according to claim 1, wherein the first display state and the second display state comprise a horizontal screen orientation or a vertical screen orientation.

13. An electronic device, comprising: a processor, a memory, and a bus, wherein the memory stores machine-readable instructions executable by the processor, wherein when the electronic device is operating, the processor communicates with the memory via the bus, and the machine-readable instructions are executed by the processor to execute steps of the memory cleaning method according to of claim 1.

14. A smart terminal, comprising:
an application determining module, configured to determine an application to be cleaned when the smart terminal is switched from a first display state to a second display state;
a space determining module, configured to determine a space to be cleaned, from a running memory and a cache space occupied during running of the application to be cleaned; and
a space cleaning module, configured to remove files from each of determined spaces to be cleaned,
wherein the space determining module is configured to:
determine, from the running memory and the cache space, at least one file to be processed, which is generated during running of the application to be cleaned;
detect whether each file to be processed is a running file generated during running of the application to be cleaned; and
determine a memory space corresponding to each non-running file as the space to be cleaned.

15. The smart terminal according to claim 14, wherein the application determining module is configured to:
determine at least one target application running on the smart terminal in the first display state; and
determine, as an application to be cleaned, a target application only capable of running in the first display state, from the at least one target application.

16. The smart terminal according to claim 14, wherein the space cleaning module is configured to:
acquire a unique identifier corresponding to each space to be cleaned, wherein the unique identifier corresponds to a space position in a storage space that is occupied by the space to be cleaned; and
clean the space position according to the unique identifier.

17. The smart terminal according to claim 14, further comprising a rotation controlling module, wherein the rotation controlling module is configured to:
control the smart terminal to rotate in a plane where the smart terminal is located, when receiving a rotation command output from a user terminal, or detecting that a terminal application only capable of running in the second display state is started; and
control, based on an angle of rotation of the smart terminal, the smart terminal to be switched from the first display state to the second display state.

18. The smart terminal according to claim 14, further comprising a state change module, wherein the state change module is configured to:
detect whether files have been cleaned from each space to be cleaned; and
update, from an occupied state to an idle state, a usage state corresponding to a space to be cleaned whose files have been cleaned.

* * * * *